(12) United States Patent
Wakao et al.

(10) Patent No.: US 11,319,890 B2
(45) Date of Patent: May 3, 2022

(54) ABNORMALITY DETECTION DEVICE FOR AIR-FUEL RATIO DETECTION DEVICE

(71) Applicant: TOYOTA JIDOSHA KABUSHIKI KAISHA, Toyota (JP)

(72) Inventors: Kazuhiro Wakao, Susono (JP); Yoshiyuki Kitazume, Hadano (JP); Keiichiro Aoki, Sunto-gun (JP); Yasutaka Kamiya, Inazawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/147,754

(22) Filed: Jan. 13, 2021

(65) Prior Publication Data
US 2021/0239062 A1 Aug. 5, 2021

(30) Foreign Application Priority Data
Feb. 3, 2020 (JP) .............................. JP2020-016298

(51) Int. Cl.
*F02D 41/14* (2006.01)
*F02D 41/12* (2006.01)

(52) U.S. Cl.
CPC ....... *F02D 41/1495* (2013.01); *F02D 41/123* (2013.01); *F02D 2200/0802* (2013.01)

(58) Field of Classification Search
CPC .............. F02D 41/1495; F02D 41/123; F02D 2200/0802
See application file for complete search history.

(56) References Cited

U.S. PATENT DOCUMENTS

| 3,611,802 | A  | * | 10/1971 | McCombs, Jr. | ........ F02C 7/264 73/203 |
| 9,702,315 | B1 | * | 7/2017  | Palmer       | ................. G07C 5/0808 |
| 2016/0115887 | A1 | * | 4/2016 | Tsunooka    | ................ F02D 17/04 60/274 |
| 2018/0106206 | A1 | * | 4/2018 | Tsunoda     | ................ B60W 20/16 |
| 2018/0223762 | A1 | * | 8/2018 | Insixiengmai | ........ F02D 41/123 |
| 2019/0284977 | A1 | * | 9/2019 | Kaneko      | ................. F01N 11/007 |

FOREIGN PATENT DOCUMENTS

| EP | 2063090 A1 | * | 5/2009 | ........... F02D 41/029 |
| JP | 2009-108681 A |  | 5/2009 |                       |

* cited by examiner

*Primary Examiner* — Joseph J Dallo
(74) *Attorney, Agent, or Firm* — Finnegan, Henderson, Farabow, Garrett & Dunner, LLP (57) ABSTRACT

An abnormality detection device for an air-fuel ratio detection device arranged downstream of a filter is equipped with an abnormality detection unit that detects an abnormality in the air-fuel ratio detection device based on output change characteristics of the air-fuel ratio detection device during fuel cutoff control for stopping the supply of fuel to a combustion chamber of an internal combustion engine, and a combustion determination unit that determines whether or not a combustion amount of particulate matter in a filter during fuel cutoff control is larger than a predetermined amount. The abnormality detection unit prohibits detection of an abnormality in the air-fuel ratio detection device when the combustion determination unit determines that the combustion amount is larger than the predetermined amount.

4 Claims, 8 Drawing Sheets

ABNORMALITY DETECTION DEVICE FOR AIR-FUEL RATIO DETECTION DEVICE

CROSS-REFERENCE TO RELATED APPLICATION

This application claims priority to Japanese Patent Application No. 2020-016298 filed on Feb. 3, 2020, incorporated herein by reference in its entirety.

BACKGROUND

1. Technical Field

The present disclosure relates to an abnormality detection device for an air-fuel ratio detection device.

2. Description of Related Art

Conventionally, it is known to arrange an air-fuel ratio detection device that detects an air-fuel ratio of exhaust gas in an exhaust passage of an internal combustion engine, and perform feedback control of the air-fuel ratio of an air-fuel mixture based on an output of the air-fuel ratio detection device. The air-fuel ratio of exhaust gas is controlled to a desired value through this feedback control, and the exhaust emission properties are restrained from deteriorating.

However, the air-fuel ratio detection device may gradually degrade in quality in the course of use thereof, and deteriorate in responsiveness. Therefore, it is desirable to periodically monitor whether or not there is an abnormality in the air-fuel ratio detection device.

In an abnormality diagnosis device described in Japanese Unexamined Patent Application Publication No. 2009-108681 (JP 2009-108681 A), a diagnosis of an abnormality in an air-fuel ratio detection device arranged downstream of a catalyst is carried out during fuel cutoff. The change in the output of the air-fuel ratio detection device during fuel cutoff is influenced by the amount of oxygen occluded in the catalyst. Therefore, this abnormality diagnosis device prohibits a diagnosis of an abnormality in the air-fuel ratio detection device, when the amount of intake air during fuel cutoff is smaller than a predetermined amount, with a view to reducing the dispersion of the response time of the air-fuel ratio detection device.

SUMMARY

By the way, a filter that collects particulate matter (PM) in exhaust gas may be provided in an exhaust passage of an internal combustion engine. When oxygen is supplied to the filter while the temperature of the filter is high, the PM deposited in the filter is oxidized and removed through combustion. Therefore, when fuel cutoff is carried out while the temperature of the filter is high, the concentration of oxygen in air supplied to the exhaust passage falls as the air passes through the filter.

However, in the method described in (JP 2009-108681 A, the influence of the combustion of PM in the filter on the responsiveness of the air-fuel ratio detection device is not taken into account at all in the case where the air-fuel ratio detection device is arranged downstream of the filter. Accordingly, there is room for improvement in the method of diagnosing an abnormality in the air-fuel ratio detection device.

In view of the aforementioned problem, the present disclosure aims at enhancing the accuracy in detecting an abnormality in an air-fuel ratio detection device arranged downstream of a filter.

The gist of the present disclosure is as follows.

(1) An abnormality detection device for an air-fuel ratio detection device arranged downstream of a filter that collects particulate matter in exhaust gas in an exhaust passage of an internal combustion engine is equipped with an abnormality detection unit that detects an abnormality in the air-fuel ratio detection device based on output change characteristics of the air-fuel ratio detection device during fuel cutoff control for stopping the supply of fuel to a combustion chamber of the internal combustion engine, and a combustion determination unit that determines whether or not a combustion amount of the particulate matter in the filter during the fuel cutoff control is larger than a predetermined amount. The abnormality detection unit prohibits detection of an abnormality in the air-fuel ratio detection device when the combustion determination unit determines that the combustion amount is larger than the predetermined amount.

(2) In the abnormality detection device for the air-fuel ratio detection device described above in (1), the combustion determination unit may determine whether or not the combustion amount is larger than the predetermined amount, based on an output of the air-fuel ratio detection device during the fuel cutoff control.

(3) In the abnormality detection device for the air-fuel ratio detection device described above in (1), the combustion determination unit may determine whether or not the combustion amount is larger than the predetermined amount, based on an estimated temperature of the filter during the fuel cutoff control.

(4) In the abnormality detection device for the air-fuel ratio detection device described above in any one of (1) to (3), the predetermined amount may be zero.

The present disclosure makes it possible to enhance the accuracy in detecting an abnormality in an air-fuel ratio detection device arranged downstream of a filter.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

The embodiments of the present disclosure will be described hereinafter in detail with reference to the drawings. Incidentally, in the following description, like components are denoted by like reference numerals.

First Embodiment

The first embodiment of the present disclosure will be described first with reference to FIGS. 1 to 7.

(Description of Entire Internal Combustion Engine)

Figure 1:
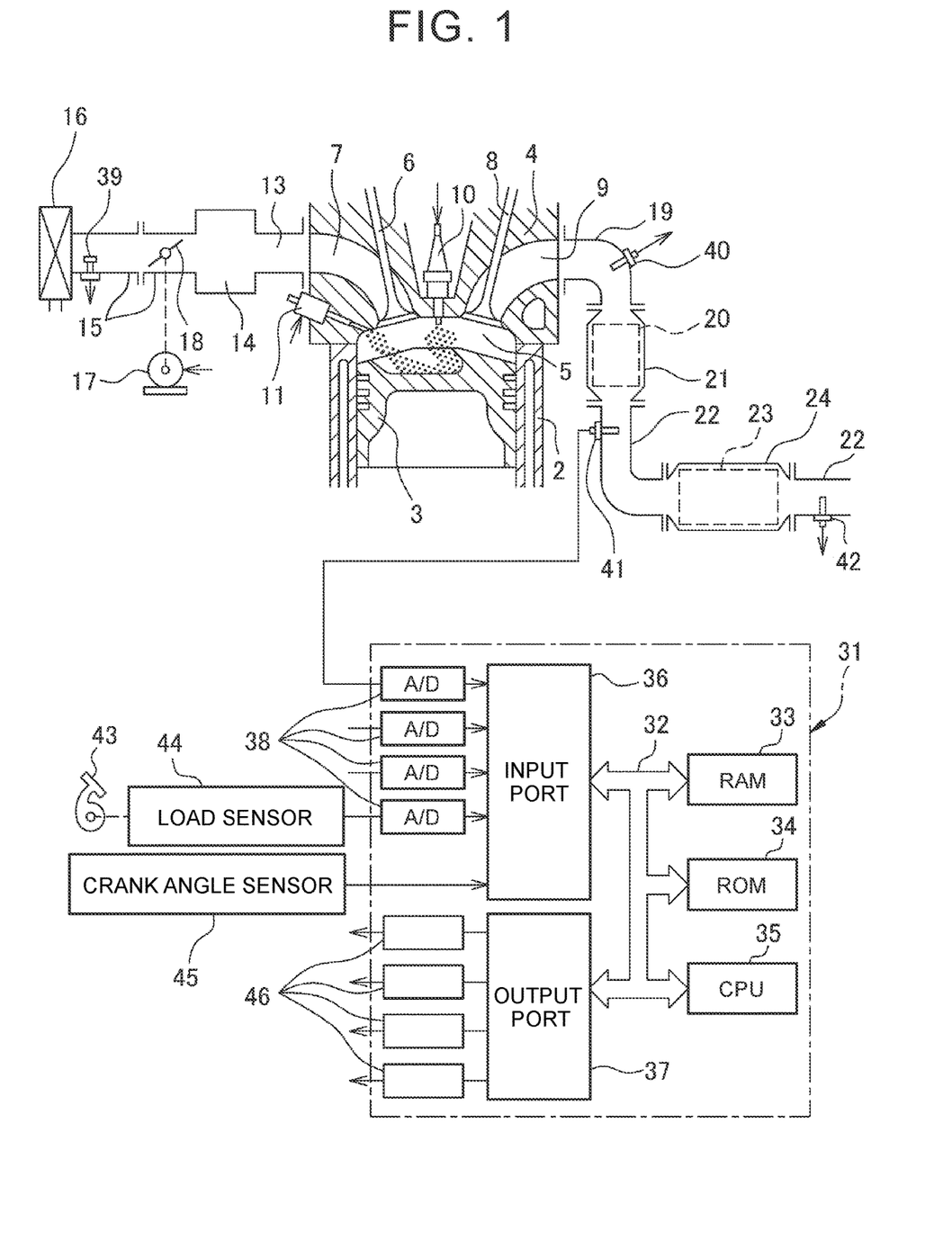
FIG. 1 is a view schematically showing an internal combustion engine that is provided with an abnormality detection device for an air-fuel ratio detection device according to the first embodiment of the present disclosure.

FIG. 1 is a view schematically showing an internal combustion engine that is provided with an abnormality detection device for an air-fuel ratio detection device according to the first embodiment of the present disclosure. The internal combustion engine shown in FIG. 1 is a spark-ignited internal combustion engine. The internal combustion engine is mounted on a vehicle.

Referring to FIG. 1, a cylinder block is denoted by 2, a piston that moves in a reciprocating manner in the cylinder block 2 is denoted by 3, a cylinder head fixed on the cylinder block 2 is denoted by 4, a combustion chamber formed between the piston 3 and the cylinder head 4 is denoted by 5, an intake valve is denoted by 6, an intake port is denoted by 7, an exhaust valve is denoted by 8, and an exhaust port is denoted by 9. The intake valve 6 opens and closes the intake port 7, and the exhaust valve 8 opens and closes the exhaust port 9.

As shown in FIG. 1, an ignition plug 10 is arranged at a central portion of an inner wall surface of the cylinder head 4, and a fuel injection valve 11 is arranged at a peripheral portion of the inner wall surface of the cylinder head 4. The ignition plug 10 is configured to generate sparks in accordance with an ignition signal. Besides, the fuel injection valve 11 injects a predetermined amount of fuel into the combustion chamber 5 in accordance with an injection signal. In the present embodiment, gasoline having a theoretical air-fuel ratio of 14.6 is used as fuel.

The intake port 7 of each cylinder is coupled to a surge tank 14 via a corresponding intake branch pipe 13, and the surge tank 14 is coupled to an air cleaner 16 via an intake pipe 15. The intake port 7, the intake branch pipe 13, the surge tank 14, the intake pipe 15, and the like form an intake passage that guides air to the combustion chamber 5. Besides, a throttle valve 18 that is driven by a throttle valve drive actuator 17 is arranged in the intake pipe 15. The throttle valve 18 is turned by the throttle valve drive actuator 17, so the opening area of the intake passage can be changed.

On the other hand, the exhaust port 9 of each cylinder is coupled to an exhaust manifold 19. The exhaust manifold 19 has a plurality of branch portions coupled to exhaust ports 9 respectively, and an aggregate portion where these branch portions are aggregated. The aggregate portion of the exhaust manifold 19 is coupled to an upstream casing 21 in which a catalyst 20 is incorporated. The upstream casing 21 is coupled to a downstream casing 24 in which a filter 23 is incorporated, via an exhaust pipe 22. The exhaust port 9, the exhaust manifold 19, the upstream casing 21, the exhaust pipe 22, the downstream casing 24, and the like form an exhaust passage through which the exhaust gas generated through the combustion of an air-fuel mixture in the combustion chamber 5 is discharged.

Various kinds of control of the internal combustion engine are performed by an electronic control unit (ECU) 31. That is, the ECU 31 functions as a control apparatus for the internal combustion engine. Outputs of various sensors provided in the internal combustion engine are input to the ECU 31, and the ECU 31 controls various actuators of the internal combustion engine based on the outputs of the various sensors and the like.

The ECU 31 is configured as a digital computer, and is equipped with a random access memory (RAM) 33, a read only memory (ROM) 34, a microprocessor (CPU) 35, an input port 36, and an output port 37 that are connected to one another via a bidirectional bus 32. Incidentally, although the single ECU 31 is provided in the present embodiment, a plurality of ECU's may be provided for various functions respectively.

An airflow meter 39 that detects a flow rate of air flowing in the intake pipe 15 is arranged in the intake pipe 15, and an output of the airflow meter 39 is input to the input port 36 via a corresponding AD converter 38.

Besides, a first air-fuel ratio sensor 40 that detects an air-fuel ratio of exhaust gas discharged from the combustion chamber 5 of the internal combustion engine and flowing into the catalyst 20 is arranged in the exhaust passage upstream of the catalyst 20 (the aggregate portion of the exhaust manifold 19). An output of the first air-fuel ratio sensor 40 is input to the input port 36 via a corresponding AD converter 38.

Besides, a second air-fuel ratio sensor 41 that detects an air-fuel ratio of exhaust gas flowing out from the catalyst 20 and into the filter 23 is arranged in the exhaust passage downstream of the catalyst 20 and upstream of the filter 23 (in the exhaust pipe 22 between the catalyst 20 and the filter 23). An output of the second air-fuel ratio sensor 41 is input to the input port 36 via a corresponding AD converter 38.

Besides, a third air-fuel ratio sensor 42 that detects an air-fuel ratio of exhaust gas flowing out from the filter 23 is arranged in the exhaust passage downstream of the filter 23 (in the exhaust pipe 22 downstream of the filter 23). An output of the third air-fuel ratio sensor 42 is input to the input port 36 via a corresponding AD converter 38.

Besides, a load sensor 44 is connected to an accelerator pedal 43 provided in the vehicle mounted with the internal combustion engine. The load sensor 44 generates an output voltage proportional to a depression amount of the accelerator pedal 43. An output voltage of the load sensor 44 is input to the input port 36 via a corresponding AD converter 38. The ECU 31 calculates an engine load based on the output of the load sensor 44.

Besides, a crank angle sensor 45 that generates an output pulse every time a crankshaft rotates by a predetermined angle (e.g., 10°) is connected to the input port 36. This output pulse is input to the input port 36. The ECU 31 calculates an engine rotational speed based on an output of the crank angle sensor 45.

On the other hand, the output port 37 is connected to various actuators of the internal combustion engine via corresponding drive circuits 46 respectively. In the present embodiment, the output port 37 is connected to the ignition plug 10, the fuel injection valve 11, and the throttle valve drive actuator 17, which are controlled by the ECU 31. In concrete terms, the ECU 31 controls the ignition timing of the ignition plug 10, the timing and amount of injection of the fuel injection valve 11, and the opening degree of the throttle valve 18.

Incidentally, the above-mentioned internal combustion engine is a non-supercharged internal combustion engine that uses gasoline as fuel, but the configuration of the internal combustion engine is not limited as described above. Accordingly, the concrete configurational details of the internal combustion engine such as cylinder arrangement, the mode of fuel injection, the configuration of intake and exhaust systems, the configuration of a valve gear, and the presence or absence of a supercharger may be different from those shown in FIG. 1. For example, the fuel injection valve 11 may be arranged in such a manner as to inject fuel into the intake port 7.

The internal combustion engine is equipped with the catalyst 20 and the filter 23 that are arranged in the exhaust passage, as an exhaust gas control apparatus that controls the emission properties of exhaust gas discharged from an engine body. In the present embodiment, the filter 23 is arranged downstream of the catalyst 20 in the exhaust passage of the internal combustion engine.

The catalyst 20 is a three-way catalyst that can occlude oxygen and that can simultaneously remove, for example, hydrocarbons (HC), carbon monoxide (CO), and nitrogen oxides (NOx) from exhaust gas. The catalyst 20 has a carrier made of ceramic, metal, or the like, a noble metal (e.g., platinum (Pt), palladium (Pd), rhodium (Rh), or the like) having catalysis, and a cocatalyst (e.g., ceria ($CeO_2$) or the like) having oxygen occlusion capacity. The noble metal and the cocatalyst are carried by the carrier.

Figure 2:
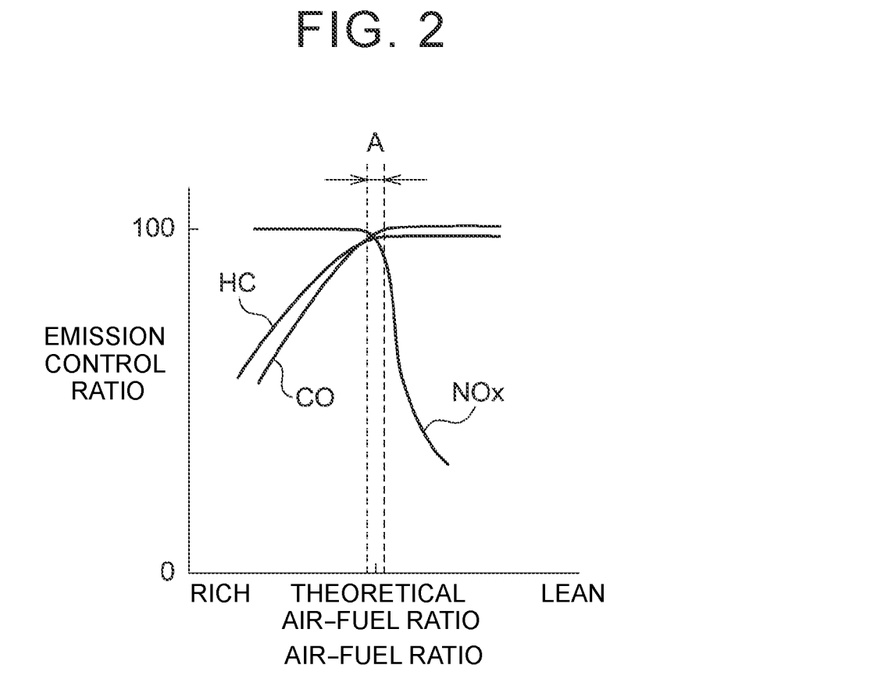
FIG. 2 shows exhaust gas control characteristics of a three-way catalyst.

FIG. 2 shows exhaust gas control characteristics of the three-way catalyst. As shown in FIG. 2, the rates of removal of HC, CO, and NOx from exhaust gas by the catalyst 20 are very high when the air-fuel ratio of exhaust gas flowing into the catalyst 20 is in a region close to the theoretical air-fuel ratio (an exhaust gas control window A in FIG. 2). Accordingly, the catalyst 20 can effectively remove HC, CO, and NOx from exhaust gas when the air-fuel ratio of exhaust gas is held equal to the theoretical air-fuel ratio.

Besides, the catalyst 20 occludes or discharges oxygen in accordance with the air-fuel ratio of exhaust gas, with the aid of the cocatalyst. In concrete terms, the catalyst 20 occludes excessive oxygen in exhaust gas when the air-fuel ratio of exhaust gas is leaner than the theoretical air-fuel ratio. On the other hand, the catalyst 20 discharges the oxygen that is needed to oxidize HC and CO, when the air-fuel ratio of exhaust gas is richer than the theoretical air-fuel ratio. As a result, even when the air-fuel ratio of exhaust gas slightly deviates from the theoretical air-fuel ratio, the air-fuel ratio on the surface of the catalyst 20 is held close to the theoretical air-fuel ratio, and the catalyst 20 effectively removes HC, CO, and NOx from exhaust gas.

The filter 23 collects particulate matter (PM) in exhaust gas, and is made of, for example, porous ceramic. In the present embodiment, the filter 23 is a so-called gasoline particulate filter (GPF).

When exhaust gas containing PM flows into the filter 23, the PM is collected by the filter 23 and is deposited in the filter 23. On the other hand, when oxygen is supplied to the filter 23 while the temperature of the filter 23 is high, the PM deposited in the filter 23 is oxidized and removed through combustion. This phenomenon is referred to as regeneration of the filter 23. The amount of PM deposited in the filter 23 decreases through regeneration of the filter 23.

(Output Characteristics of Air-Fuel Ratio Sensors)

The first air-fuel ratio sensor 40, the second air-fuel ratio sensor 41, and the third air-fuel ratio sensor 42 are arranged in the exhaust passage of the internal combustion engine, as air-fuel ratio detection devices that detect the air-fuel ratio of exhaust gas. The first air-fuel ratio sensor 40, the second air-fuel ratio sensor 41, and the third air-fuel ratio sensor 42 are configured in a similar manner. Therefore, the output characteristics of the third air-fuel ratio sensor 42 will be described hereinafter with reference to FIGS. 3 and 4.

Figure 3:
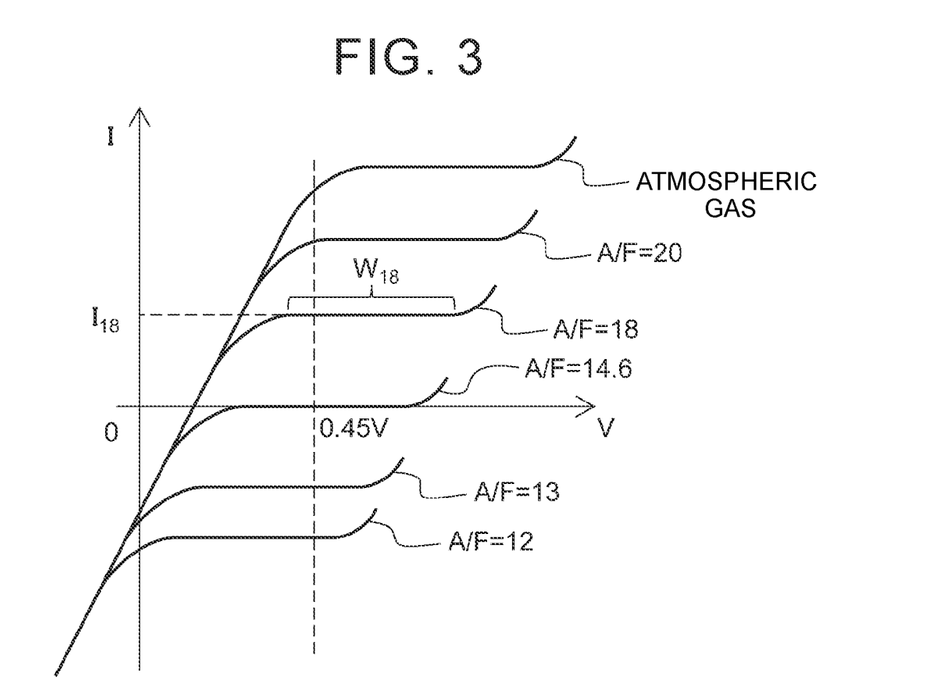
FIG. 3 is a view showing voltage-current characteristics of a third air-fuel ratio sensor.

FIG. 3 is a view showing voltage-current (V-I) characteristics of the third air-fuel ratio sensor 42. As is apparent from FIG. 3, an output current I of the third air-fuel ratio sensor 42 increases as the air-fuel ratio of exhaust gas rises (shifts to the lean side). Besides, on a V-I line at each air-fuel ratio, there is a region substantially parallel to a V-axis, namely, a region where the output current hardly changes even when the sensor application voltage changes. This voltage region is referred to as a limiting current region, and the current at this moment is referred to as a limiting current. In FIG. 3, the limiting current region and the limiting current at the time when the air-fuel ratio of exhaust gas is 18 are denoted by $W_{18}$ and $I_{18}$ respectively. Accordingly, the third air-fuel ratio sensor 42 is a limiting current-type air-fuel ratio sensor.

Figure 4:
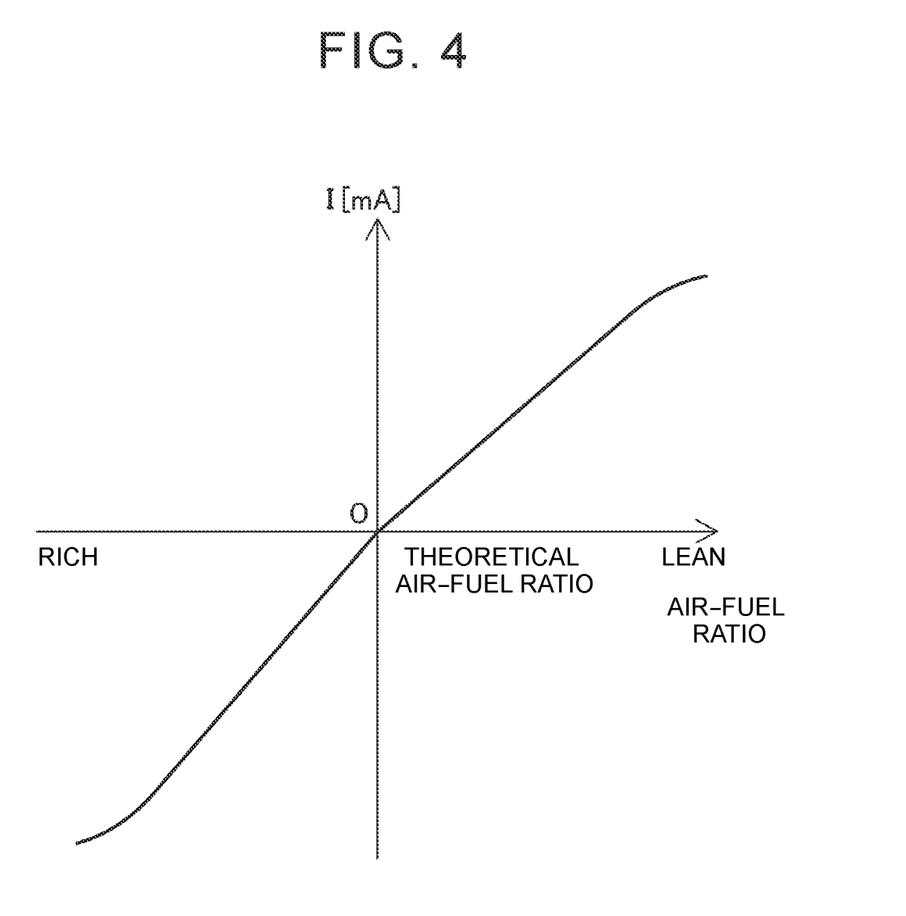
FIG. 4 is a view showing a relationship between an air-fuel ratio of exhaust gas and an output current at the time when a sensor application voltage is 0.45 V.

FIG. 4 is a view showing a relationship between the air-fuel ratio of exhaust gas and the output current I at the time when the sensor application voltage is 0.45 V. That is, FIG. 4 shows a relationship between the air-fuel ratio of exhaust gas and the output current I on points on a broken line of FIG. 3. As is apparent from FIG. 4, when the air-fuel ratio of exhaust gas is the theoretical air-fuel ratio, the output current I of the third air-fuel ratio sensor 42 is zero. Besides, the output current I of the third air-fuel ratio sensor 42 increases as the concentration of oxygen in exhaust gas rises, namely, as the air-fuel ratio of exhaust gas shifts to the lean side. Accordingly, the third air-fuel ratio sensor 42 can continuously (linearly) detect the air-fuel ratio of exhaust gas.

(Abnormality Detection Device for Air-Fuel Ratio Detection Devices)

However, the air-fuel ratio detection devices such as the first air-fuel ratio sensor 40, the second air-fuel ratio sensor 41, and the third air-fuel ratio sensor 42 may gradually degrade in quality in the course of use thereof, and deteriorate in responsiveness. When the air-fuel ratio detection devices deteriorate in responsiveness, the air-fuel ratio of the air-fuel mixture cannot be appropriately controlled based on the outputs of the air-fuel ratio detection devices, and the exhaust emission properties may deteriorate. In the present embodiment, therefore, the internal combustion engine is provided with an abnormality detection device that detects abnormalities in the air-fuel ratio detection device to monitor degradation states of the air-fuel ratio detection devices.

Figure 5:
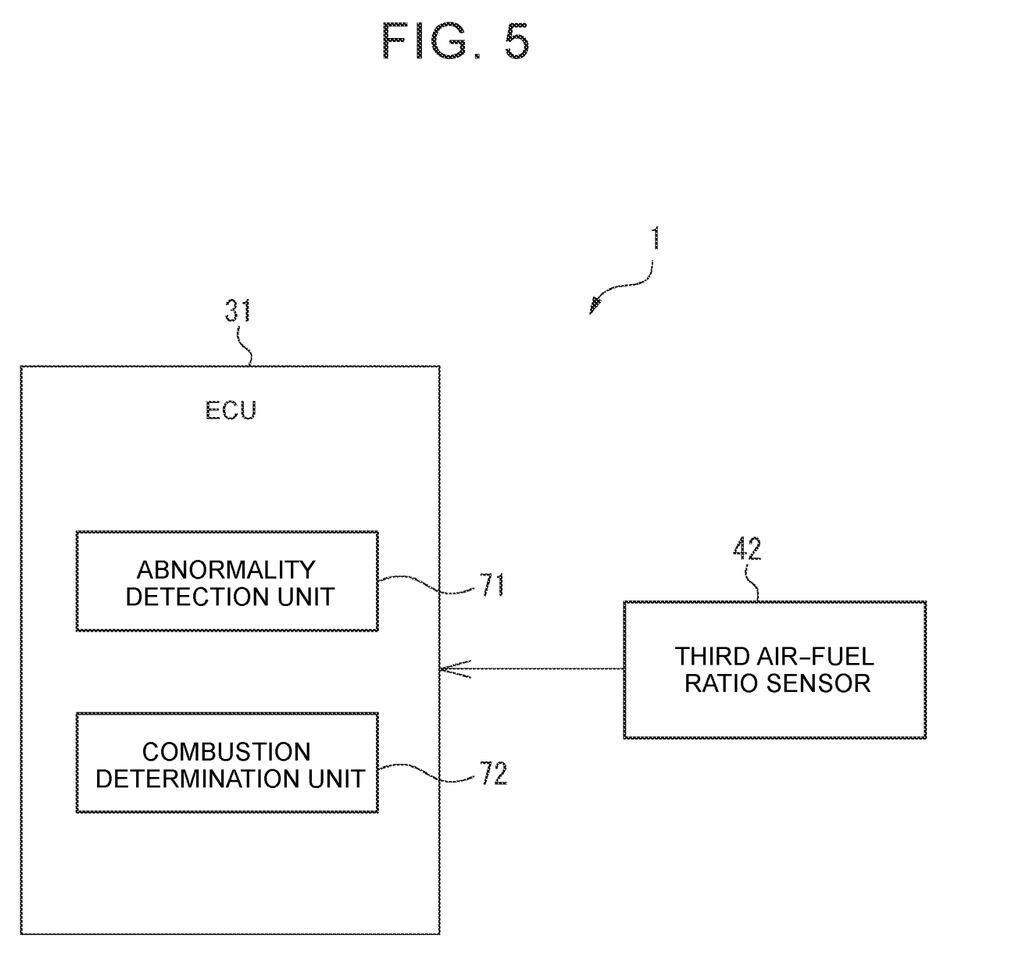
FIG. 5 is a block diagram schematically showing the configuration of the abnormality detection device according to the first embodiment of the present disclosure.

FIG. 5 is a block diagram schematically showing the configuration of an abnormality detection device 1 according to the first embodiment of the present disclosure. The abnormality detection device 1 is equipped with an abnormality detection unit 71 and a combustion determination unit 72, and diagnoses an abnormality in the third air-fuel ratio sensor 42. In the present embodiment, the ECU 31 functions as the abnormality detection unit 71 and the combustion determination unit 72. The abnormality detection unit 71 and the combustion determination unit 72 are functional blocks that are realized through the execution of a program stored in the ROM 34 of the ECU 31 by the CPU 35 of the ECU 31.

In the internal combustion engine, fuel cutoff control for stopping the supply of fuel to the combustion chamber 5 is performed when a predetermined execution condition is fulfilled. The predetermined execution condition is fulfilled, for example, when the depression amount of the accelerator pedal 43 is zero (i.e., the engine load is zero) and the engine rotational speed is equal to or higher than a predetermined rotational speed that is higher than a rotational speed at the time of idling.

When fuel cutoff control is performed, air is supplied from the intake passage to the exhaust passage, and then is supplied to the catalyst 20. As a result, the occlusion amount of oxygen in the catalyst 20 reaches a maximum oxygen occlusion amount, and the oxygen that has flowed out from the catalyst 20 reaches the third air-fuel ratio sensor 42 via the filter 23. Therefore, when fuel cutoff control is performed, the output of the third air-fuel ratio sensor 42 shifts to the lean side. In this case, if the third air-fuel ratio sensor 42 has deteriorated in responsiveness, the output of the third air-fuel ratio sensor 42 changes slowly.

Therefore, the abnormality detection unit 71 detects an abnormality in the third air-fuel ratio sensor 42 based on output change characteristics of the third air-fuel ratio sensor 42 during fuel cutoff control. For example, the abnormality detection unit 71 determines that the third air-fuel ratio sensor 42 is abnormal when the time of passage of a predetermined output zone by the output of the third air-fuel ratio sensor 42 is longer than a threshold. On the other hand, the abnormality detection unit 71 determines that the third air-fuel ratio sensor 42 is normal when the time of passage of the predetermined output zone by the output of the third air-fuel ratio sensor 42 is equal to or shorter than the threshold.

By the way, as shown in FIG. 1, unlike the first air-fuel ratio sensor 40 and the second air-fuel ratio sensor 41, the third air-fuel ratio sensor 42 is arranged downstream of the filter 23 in the exhaust passage of the internal combustion engine. Therefore, the output of the third air-fuel ratio sensor 42 is influenced by the combustion of PM when the PM deposited in the filter 23 burns during fuel cutoff control.

Figure 6:
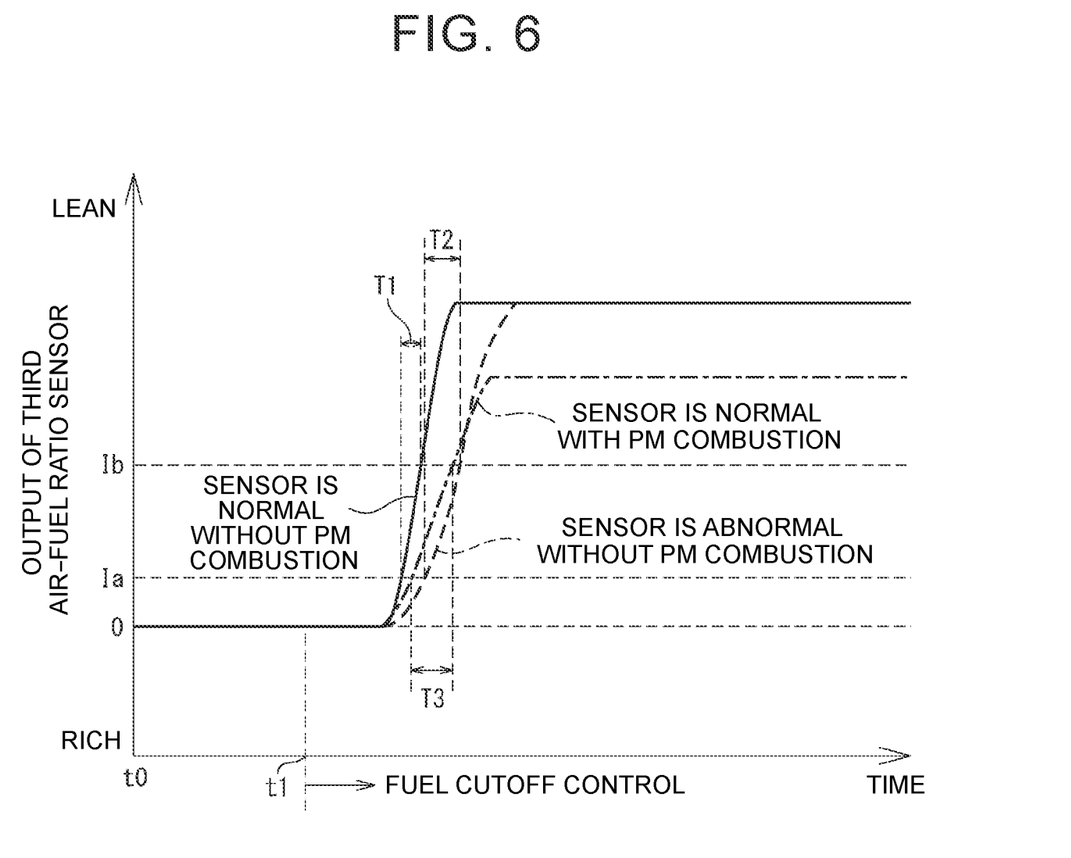
FIG. 6 is a time chart of an output of a third air-fuel ratio sensor at the time when fuel cutoff control is performed.

FIG. 6 is a time chart of the output of the third air-fuel ratio sensor 42 at the time when fuel cutoff control is performed. In FIG. 6, changes in output in the case where the third air-fuel ratio sensor 42 is normal and PM does not burn are indicated by a solid line, changes in output in the case where the third air-fuel ratio sensor 42 is abnormal and PM does not burn are indicated by a broken line, and changes in output in the case where the third air-fuel ratio sensor 42 is normal and PM burns are indicated by an alternate long and short dash line.

First of all, the case where the third air-fuel ratio sensor 42 is normal and PM does not burn will be described. In the example of FIG. 6, at a timing t0 before the start of fuel cutoff control, the output of the third air-fuel ratio sensor 42 is zero, which indicates that the air-fuel ratio of exhaust gas that has flowed into the third air-fuel ratio sensor 42 is the theoretical air-fuel ratio.

After the timing t0, fuel cutoff control is started at a timing t1. As a result, the output of the third air-fuel ratio sensor 42 rises toward the lean side after the timing t1. In this case, the output of the third air-fuel ratio sensor 42 passes a predetermined output zone (Ia to Ib in the example of FIG. 6), and the time of passage of the predetermined output zone by the output is T1.

On the other hand, in the case where the third air-fuel ratio sensor 42 is abnormal, namely, in the case where the third air-fuel ratio sensor 42 has deteriorated in responsiveness, the speed of change in the output of the third air-fuel ratio sensor 42 decreases as indicated by the broken line in FIG. 6. Therefore, the time of passage of the predetermined output zone by the output of the third air-fuel ratio sensor 42 is T2, which is longer than T1.

Besides, when PM burns in the filter 23 during fuel cutoff control, the oxygen in air is consumed in the filter 23, and combustion gas is mixed with the air flowing out from the filter 23. As a result, the concentration of oxygen in air falls when the air passes through the filter 23. Accordingly, the output of the third air-fuel ratio sensor 42 is lower (the air-fuel ratio of exhaust gas is richer) when PM burns than when PM does not burn. Therefore, even when the third air-fuel ratio sensor 42 is normal, the speed of change in the output of the third air-fuel ratio sensor 42 is low as indicated by the alternate long and short dash line in FIG. 6, and the time of passage of the predetermined output zone by the output of the third air-fuel ratio sensor 42 is T3, which is longer than T1.

Accordingly, in the case where PM burns in the filter 23 during fuel cutoff control, even when the third air-fuel ratio sensor 42 is normal, it may be erroneously determined that the third air-fuel ratio sensor 42 has deteriorated in responsiveness. Thus, in the present embodiment, a determination is made on the combustion state of PM in the filter 23, and it is determined, based on a result of the determination, whether or not an abnormality in the third air-fuel ratio sensor 42 can be detected, as will be described hereinafter.

The combustion determination unit 72 determines whether or not the combustion amount of PM in the filter 23 during fuel cutoff control (hereinafter referred to as "the PM combustion amount") is larger than a predetermined amount. For example, the combustion determination unit 72 determines, based on an output of the third air-fuel ratio sensor 42 during fuel cutoff control, whether or not the PM combustion amount is larger than the predetermined amount. The predetermined amount is determined in advance, and is set such that the amount of fluctuation in the output change characteristics of the third air-fuel ratio sensor 42 is confined within a permissible error range.

Incidentally, the predetermined amount may be zero. That is, the combustion determination unit 72 may determine whether or not PM has burnt in the filter 23 during fuel cutoff control. Thus, the influence of the combustion of PM can be completely eliminated.

As described above, the output of the third air-fuel ratio sensor 42 is lower (the air-fuel ratio of exhaust gas is richer) when PM burns in the filter 23 than when PM does not burn in the filter 23. Therefore, the combustion determination unit 72 determines that the PM combustion amount is equal to or smaller than the predetermined amount when the output of the third air-fuel ratio sensor 42 during fuel cutoff control has reached a predetermined value, and determines that the PM combustion amount is larger than the predetermined amount when the output of the third air-fuel ratio sensor 42 during fuel cutoff control has not reached the predetermined value.

The abnormality detection unit 71 prohibits detection of an abnormality in the third air-fuel ratio sensor 42 when the combustion determination unit 72 determines that the PM combustion amount is larger than the predetermined amount. Thus, an abnormality in the third air-fuel ratio sensor 42 can be restrained from being erroneously detected, and hence the accuracy in detecting an abnormality in the third air-fuel ratio sensor 42 can be enhanced.

(Abnormality Detection Process)

Figure 7:
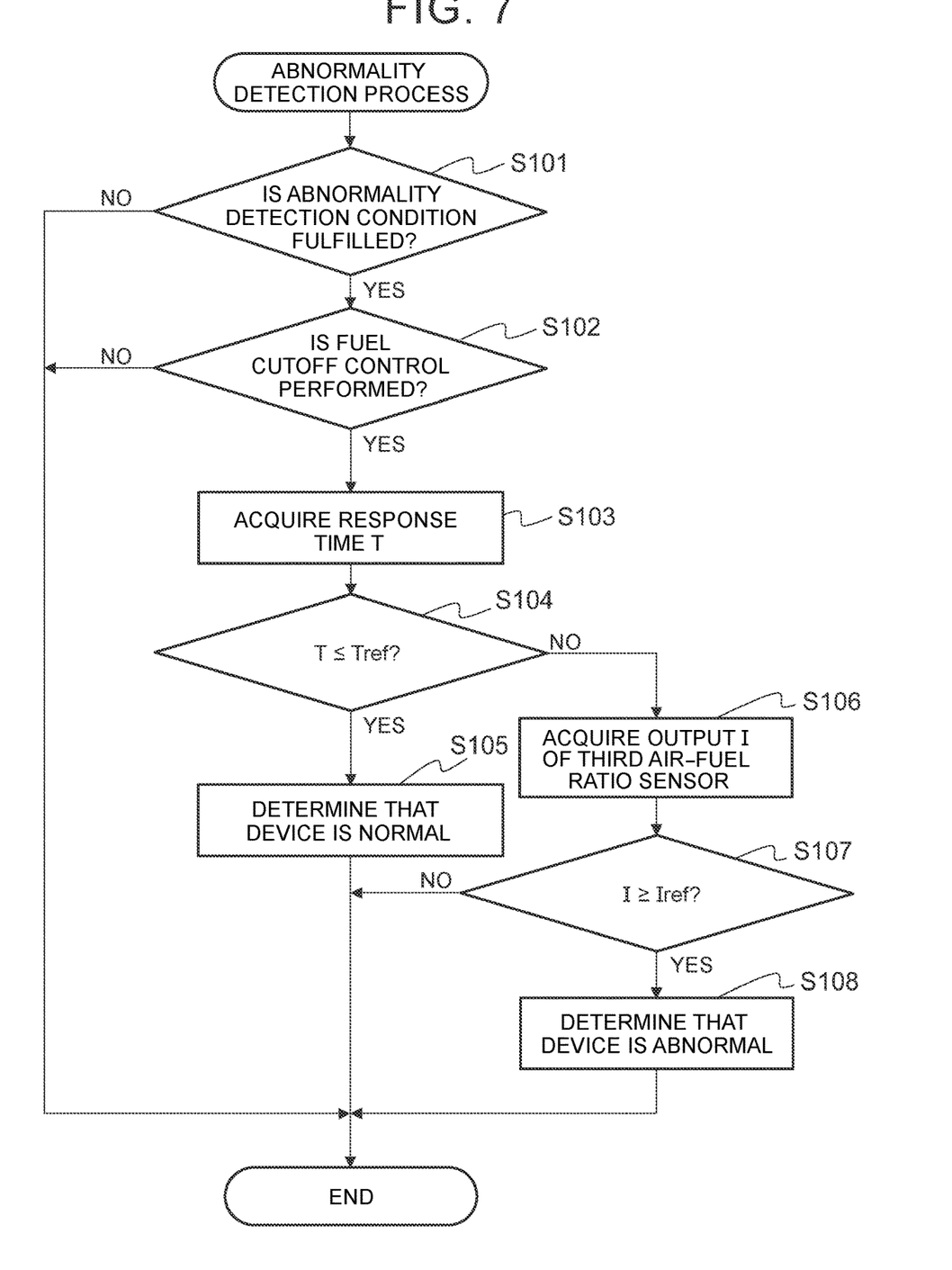
FIG. 7 is a flowchart showing a control routine of an abnormality detection process in the first embodiment.

The control for detecting an abnormality in the third air-fuel ratio sensor 42 will be described hereinafter in detail with reference to a flowchart of FIG. 7. FIG. 7 is a flowchart showing a control routine of an abnormality detection process in the first embodiment. The present control routine is repeatedly executed by the ECU 31 after startup of the internal combustion engine.

First of all, in step S101, the abnormality detection unit 71 determines whether or not an abnormality detection condition is fulfilled. The abnormality detection condition is fulfilled, for example, when the temperature of the third air-fuel ratio sensor 42 is equal to or higher than an activation temperature determined in advance and it has not been determined yet whether or not there is an abnormality in the third air-fuel ratio sensor 42 after startup of the internal combustion engine. The temperature of the third air-fuel ratio sensor 42 is calculated based on, for example, an impedance of the third air-fuel ratio sensor 42.

If it is determined in step S101 that the abnormality detection condition is not fulfilled, the present control routine is ended. On the other hand, if it is determined in step S101 that the abnormality detection condition is fulfilled, the present control routine proceeds to step S102.

In step S102, the abnormality detection unit 71 determines whether or not fuel cutoff control is performed. If it is determined that fuel cutoff control is not performed, the present routine is ended. On the other hand, if it is determined that fuel cutoff control is performed, the present control routine proceeds to step S103.

In step S103, the abnormality detection unit 71 acquires a response time T as the time of passage of the predetermined output zone by the output of the third air-fuel ratio sensor 42. The predetermined output zone is determined in advance, and is set as a range that is leaner than the theoretical air-fuel ratio and that is richer than the air-fuel ratio of air.

Subsequently, the abnormality detection unit 71 determines in step S104 whether or not the response time T is equal to or shorter than a threshold Tref. The threshold Tref is determined in advance through an experiment, a calculation, or the like.

If it is determined in step S104 that the response time T is equal to or shorter than the threshold Tref, the present control routine proceeds to step S105. In step S105, the abnormality detection unit 71 determines that the responsiveness of the third air-fuel ratio sensor 42 is normal. After step S105, the present control routine is ended.

On the other hand, if it is determined in step S104 that the response time T is longer than the threshold Tref, the present control routine proceeds to step S106. In step S106, the combustion determination unit 72 acquires an output I of the third air-fuel ratio sensor 42 during fuel cutoff control. For example, the combustion determination unit 72 acquires the output I of the third air-fuel ratio sensor 42 upon the lapse of a predetermined time from the passage of the predetermined output zone by the output of the third air-fuel ratio sensor 42.

Subsequently, in step S107, the combustion determination unit 72 determines whether or not the output I of the third air-fuel ratio sensor 42 is equal to or larger than a predetermined value Iref. The predetermined value Iref is determined in advance, and is set to a value corresponding to the air-fuel ratio of gas flowing into the third air-fuel ratio sensor 42 when the PM combustion amount is a predetermined amount.

When the predetermined amount is zero, the predetermined value Iref is set to a value corresponding to the air-fuel ratio of air. Besides, when the predetermined amount is zero, the predetermined value Iref may be set based on an output of the third air-fuel ratio sensor 42 in the case where fuel cutoff control is performed when the temperature of the filter 23 is low (e.g., when the engine load before the start of fuel cutoff control is small). That is, the predetermined value Iref may be set to an output of the third air-fuel ratio sensor 42 at the time when air actually flows into the third air-fuel ratio sensor 42. Incidentally, the predetermined value Iref is set to a value that is larger than an end point of the predetermined output zone (Ib in the example of FIG. 6) in calculating the response time T.

If it is determined in step S107 that the output I of the third air-fuel ratio sensor 42 is smaller than the predetermined value Iref, it is determined that the PM combustion amount is larger than the predetermined amount, and the present routine is ended. That is, it is not determined that the responsiveness of the third air-fuel ratio sensor 42 is abnormal. In other words, detection of an abnormality in the third air-fuel ratio sensor 42 is prohibited.

On the other hand, if it is determined in step S107 that the output I of the third air-fuel ratio sensor 42 is equal to or larger than the predetermined value Iref, it is determined that the PM combustion amount is equal to or smaller than the predetermined amount, and the present control routine proceeds to step S108. In step S108, the abnormality detection unit 71 determines that the responsiveness of the third air-fuel ratio sensor 42 is abnormal, and lights up a warning lamp provided in the vehicle mounted with the internal combustion engine. After step S108, the present control routine is ended.

Incidentally, step S106 and step S107 may be carried out between step S103 and step S104, step S104 may be carried out when the result of the determination in step S107 is positive, and the present control routine may be ended when the result of the determination in step S107 is negative. In this case, the abnormality detection unit 72 does not make a determination on an abnormality in the third air-fuel ratio sensor 42 when the abnormality detection unit 71 determines that the PM combustion amount is larger than the predetermined amount.

Besides, a gradient of the output at the time when the output of the third air-fuel ratio sensor 42 passes the predetermined output zone may be acquired in step S103, and it may be determined in step S104 whether or not the gradient of the output is equal to or larger than a threshold.

Second Embodiment

An abnormality detection device according to the second embodiment is basically identical in configuration and control to the abnormality detection device according to the first embodiment, except what will be described below. Therefore, the second embodiment of the present disclosure will be described hereinafter, focusing on what is different from the first embodiment.

Figure 8:
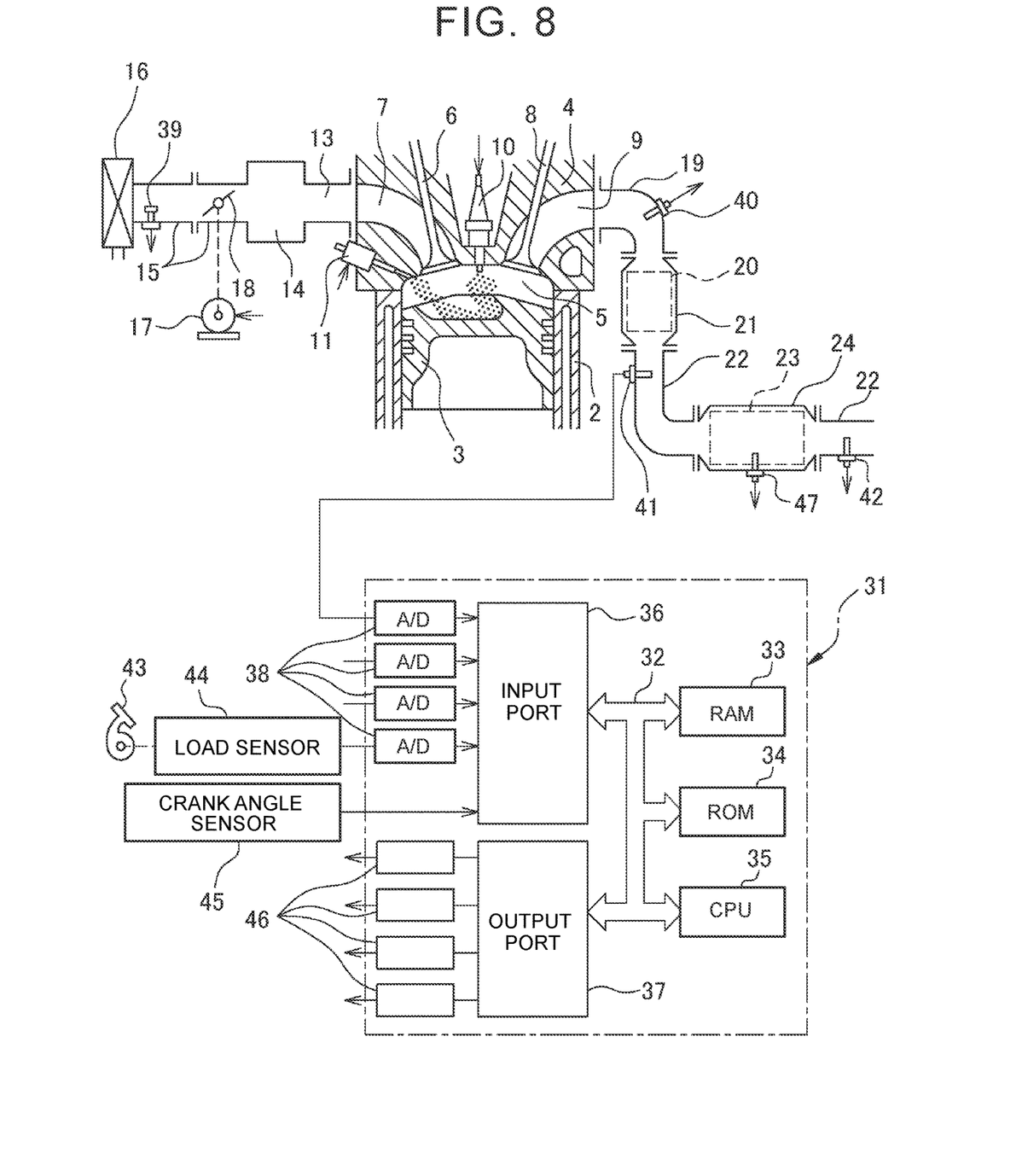
FIG. 8 is a view schematically showing an internal combustion engine that is provided with an abnormality detection device for an air-fuel ratio detection device according to the second embodiment of the present disclosure.

FIG. 8 is a view schematically showing an internal combustion engine provided with the abnormality detection device for an air-fuel ratio detection device according to the second embodiment of the present disclosure. In the second embodiment, a temperature sensor 47 that detects a temperature of the filter 23 is provided in an exhaust passage of the internal combustion engine. The temperature sensor 47 is arranged in the downstream casing 24 in which the filter 23 is incorporated. An output of the temperature sensor 47 is input to the input port 36 via a corresponding AD converter 38.

The output of the air-fuel ratio detection device such as the third air-fuel ratio sensor 42 may deviate through a degradation or the like. That is, the value of the output corresponding to a predetermined air-fuel ratio may change.

Therefore, when it is determined based on the output of the third air-fuel ratio sensor 42 whether or not combustion occurs in the filter 23, the accuracy of determination may fall.

Thus, in the second embodiment, the combustion determination unit 72 determines, based on the estimated temperature of the filter 23 during fuel cutoff control, whether or not the PM combustion amount is larger than a predetermined amount. Thus, a determination on the combustion state of PM can be made with accuracy, and hence the accuracy in detecting an abnormality in the third air-fuel ratio sensor 42 can be further enhanced.

In concrete terms, the combustion determination unit 72 acquires the temperature of the filter 23 detected by the temperature sensor 47, as the estimated temperature of the filter 23. Besides, the combustion determination unit 72 determines that the PM combustion amount is equal to or smaller than the predetermined amount when the estimated temperature of the filter during fuel cutoff control is equal to or lower than a predetermined temperature, and determines that the PM combustion amount is larger than the predetermined amount when the estimated temperature of the filter during fuel cutoff control is higher than the predetermined temperature.

Figure 9:
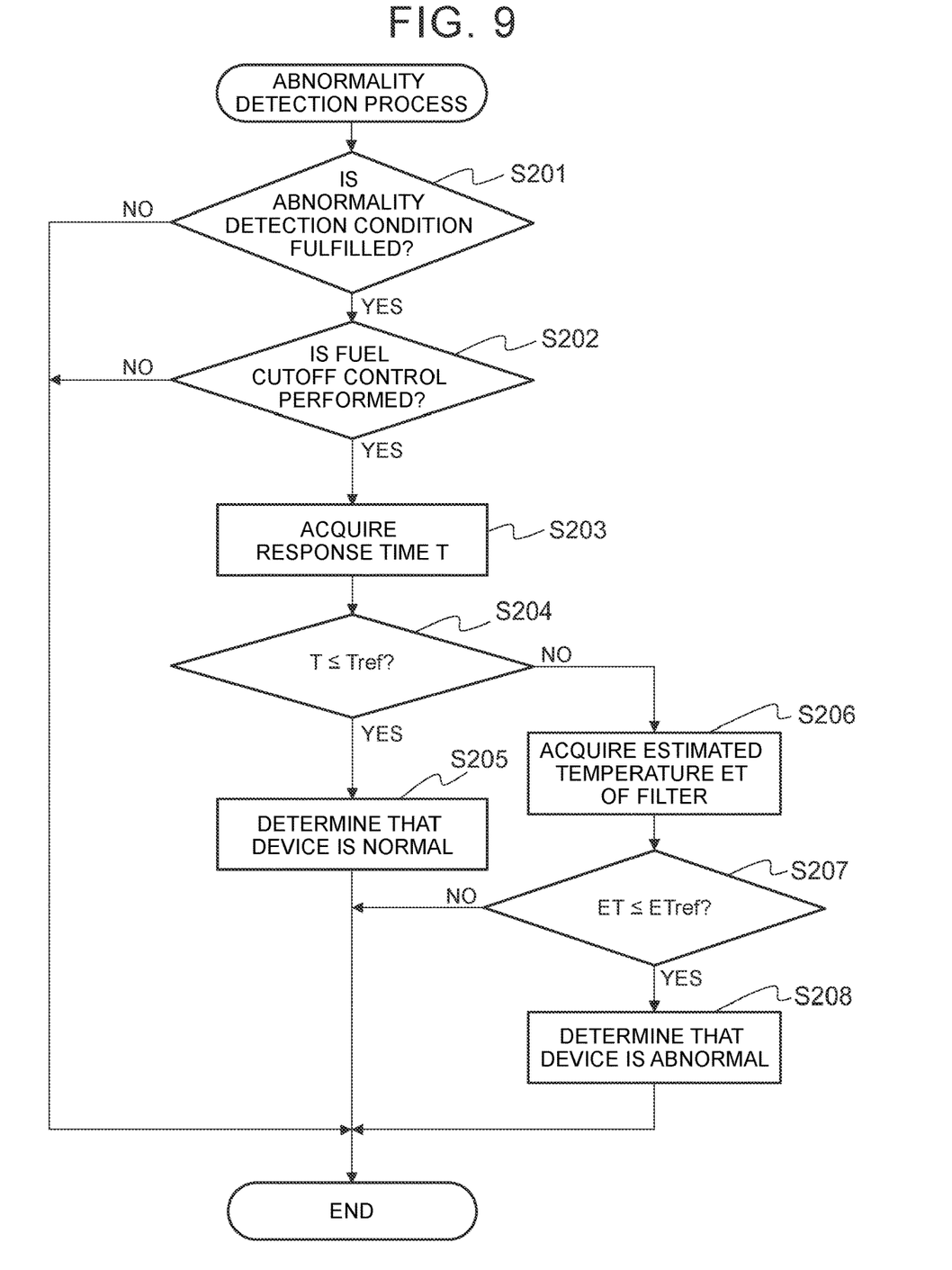
FIG. 9 is a flowchart showing a control routine of an abnormality detection process in the second embodiment.

FIG. 9 is a flowchart showing a control routine of an abnormality detection process in the second embodiment. The present control routine is repeatedly executed by the ECU 31 after startup of the internal combustion engine.

Steps S201 to S205 are identical to steps S101 to S105 of FIG. 7 respectively, and therefore will not be described below. If it is determined in step S204 that the response time T is longer than the threshold Tref, the present control routine proceeds to step S206.

In step S206, the combustion determination unit 72 acquires the temperature detected by the temperature sensor 47 during fuel cutoff control, as an estimated temperature ET of the filter 23 during fuel cutoff control. For example, the combustion determination unit 72 acquires an average of temperatures detected by the temperature sensor 47 from the start of fuel cutoff control to the passage of the predetermined output zone by the output of the third air-fuel ratio sensor 42, as the estimated temperature ET of the filter 23 during fuel cutoff control.

Incidentally, the temperature sensor 47 may be arranged in the exhaust passage between the catalyst 20 and the filter 23 to detect a temperature of exhaust gas flowing into the filter 23. Alternatively, the temperature sensor 47 may be arranged in the exhaust passage downstream of the filter 23 to detect a temperature of exhaust gas flowing out from the filter 23. In each of these cases, the combustion determination unit 72 calculates the estimated temperature ET of the filter 23 during fuel cutoff control, based on the temperature of exhaust gas detected by the temperature sensor 47.

Besides, the temperature sensor 47 may be removed from the internal combustion engine, and the combustion determination unit 72 may calculate the estimated temperature ET of the filter 23 during fuel cutoff control based on a predetermined operation parameter (e.g., an engine rotational speed, an intake air amount, an engine load, or the like) of the internal combustion engine immediately before the start of fuel cutoff control.

Subsequently, the combustion determination unit 72 determines in step S207 whether or not the estimated temperature ET of the filter 23 is equal to or lower than a predetermined temperature ETref. The predetermined temperature ETref is determined in advance, and is set to such a value that the PM combustion amount becomes equal to a predetermined amount. The predetermined temperature ETref is set to, for example, 500 to 800° C.

If it is determined in step S207 that the estimated temperature ET of the filter 23 is higher than the predetermined temperature ETref, it is determined that the PM combustion amount is larger than the predetermined amount, and the present control routine is ended. That is, it is not determined that the responsiveness of the third air-fuel ratio sensor 42 is abnormal. In other words, detection of an abnormality in the third air-fuel ratio sensor 42 is prohibited.

On the other hand, if it is determined in step S207 that the estimated temperature ET of the filter 23 is equal to or lower than the predetermined temperature ETref, it is determined that the PM combustion amount is equal to or smaller than the predetermined amount, and the present control routine proceeds to step S208. In step S208, the abnormality detection unit 71 determines that the responsiveness of the third air-fuel ratio sensor 42 is abnormal, and lights up the warning lamp provided in the vehicle mounted with the internal combustion engine. After step S208, the present control routine is ended.

Incidentally, steps S206 and S207 may be carried out between step S203 and step S204, step S204 may be carried out when the result of the determination in step S207 is positive, and the present control routine may be ended when the result of the determination in step S207 is negative. In this case, the abnormality detection unit 71 does not determine whether or not the third air-fuel ratio sensor 42 is abnormal, when the combustion determination unit 72 determines that the PM combustion amount is larger than the predetermined amount.

Besides, a gradient of the output at the time when the output of the third air-fuel ratio sensor 42 passes the predetermined output zone may be acquired in step S203, and it may be determined in step S204 whether or not the gradient of the output is equal to or larger than a threshold.

Although the preferred embodiments according to the present disclosure have been described above, the applicable embodiment is not limited to these embodiments, but can be subjected to various modifications and alterations within the scope of the claims. For example, the filter 23 may have a three-way catalytic function. That is, the filter 23 may be a so-called three-way catalyst.

Besides, the catalyst 20, the first air-fuel ratio sensor 40, and the second air-fuel ratio sensor 41 may be removed from the internal combustion engine. Besides, the filter 23 and the third air-fuel ratio sensor 42 may be arranged upstream of the catalyst 20, in the exhaust passage of the internal combustion engine.

Besides, the third air-fuel ratio sensor 42 may be an oxygen sensor that detects that the air-fuel ratio of exhaust gas is rich or lean. Besides, the third air-fuel ratio sensor 42 may be an NOx sensor capable of detecting the air-fuel ratio of exhaust gas.

Besides, the internal combustion engine may be a compression self-ignition internal combustion engine (a diesel engine). In this case, for example, an oxidation catalyst is arranged as the catalyst 20, and a diesel particulate filter (DPF) is arranged as the filter 23, in the exhaust passage of the internal combustion engine.

What is claimed is:

1. An abnormality detection device for an air-fuel ratio detection device arranged downstream of a filter that collects particulate matter in exhaust gas in an exhaust passage of an internal combustion engine, the abnormality detection device comprising:

an abnormality detection unit that detects an abnormality in the air-fuel ratio detection device based on output change characteristics of the air-fuel ratio detection device during fuel cutoff control for stopping supply of fuel to a combustion chamber of the internal combustion engine; and a combustion determination unit that determines whether or not a combustion amount of the particulate matter in the filter during the fuel cutoff control is larger than a predetermined amount, wherein the abnormality detection unit prohibits detection of an abnormality in the air-fuel ratio detection device when the combustion determination unit determines that the combustion amount is larger than the predetermined amount.

2. The abnormality detection device for the air-fuel ratio detection device according to claim 1, wherein
the combustion determination unit determines whether or not the combustion amount is larger than the predetermined amount, based on an output of the air-fuel ratio detection device during the fuel cutoff control.

3. The abnormality detection device for the air-fuel ratio detection device according to claim 1, wherein
the combustion determination unit determines whether or not the combustion amount is larger than the predetermined amount, based on an estimated temperature of the filter during the fuel cutoff control.

4. The abnormality detection device for the air-fuel ratio detection device according to claim 1, wherein
the predetermined amount is zero.

* * * * *